United States Patent
Li et al.

(10) Patent No.: US 7,005,185 B2
(45) Date of Patent: Feb. 28, 2006

(54) QUICK CURE CARBON FIBER REINFORCED EPOXY RESIN

(75) Inventors: Wei (Helen) Li, Puyallup, WA (US); Kishio Miwa, Shiga (JP)

(73) Assignee: Toray Composites (America), Inc., Tacoma, WA (US)

( * ) Notice: Subject to any disclaimer, the term of this patent is extended or adjusted under 35 U.S.C. 154(b) by 0 days.

(21) Appl. No.: 10/307,201

(22) Filed: Nov. 27, 2002

(65) Prior Publication Data

US 2003/0124355 A1 Jul. 3, 2003

Related U.S. Application Data

(63) Continuation-in-part of application No. 09/905,264, filed on Jul. 13, 2001, now abandoned.

(51) Int. Cl.
*B32B 27/38* (2006.01)

(52) U.S. Cl. .......... 428/413; 528/119; 528/120; 528/121; 528/327; 528/363; 528/365; 523/427; 523/428; 523/466; 523/468; 525/404

(58) Field of Classification Search .......... 428/413; 528/119, 120, 121, 327, 363, 365; 523/427, 523/428, 466, 468; 525/404
See application file for complete search history.

(56) References Cited

U.S. PATENT DOCUMENTS

| | | | | |
|---|---|---|---|---|
| 3,386,956 A | * | 6/1968 | Nawakowski et al. | 260/47 |
| 3,660,316 A | * | 5/1972 | Scahefer et al. | 528/367 |
| 3,759,914 A | * | 9/1973 | Simms et al. | 260/37 |
| 3,945,971 A | * | 3/1976 | Harrison et al. | 260/47 |
| 3,956,237 A | * | 5/1976 | Doorakian et al. | 260/47 |
| 3,988,257 A | * | 10/1976 | Harrison et al. | 252/182 |
| 4,569,956 A | * | 2/1986 | Breitigam et al. | 523/402 |
| 4,775,728 A | * | 10/1988 | Goel | 525/523 |
| 4,783,518 A | * | 11/1988 | Goel | 528/90 |
| 4,859,533 A | * | 8/1989 | Seiya et al. | 428/366 |
| 4,931,496 A | * | 6/1990 | Qureshi et al. | 524/612 |
| 5,214,098 A | * | 5/1993 | Setiabudi et al. | 525/109 |
| 5,407,978 A | * | 4/1995 | Bymark et al. | 523/457 |
| 5,453,453 A | * | 9/1995 | Lamon et al. | 521/54 |
| 5,589,523 A | * | 12/1996 | Sawaoka et al. | 532/211 |
| 5,599,629 A | * | 2/1997 | Gardner et al. | 428/413 |

FOREIGN PATENT DOCUMENTS

| | | | |
|---|---|---|---|
| EP | 0379172 | * | 1/1990 |
| EP | 0398700 | * | 11/1990 |
| EP | 0603131 | * | 12/1993 |
| EP | 0754741 | * | 1/1997 |
| EP | 0662488 | * | 11/1999 |
| JP | 54026000 | * | 2/1979 |
| WO | WO99/36484 | * | 7/1999 |

OTHER PUBLICATIONS

Abstract, JP 54026000, Tokizawa et al., Feb. 1979.*
Product Data Sheet for EPIKOTE 828 resin, Sep. 2002.*
Product Information, D.E.N. 438, Oct. 2001.*

* cited by examiner

*Primary Examiner*—David J. Buttner
*Assistant Examiner*—Christopher Keehan
(74) *Attorney, Agent, or Firm*—Morrison & Foerster LLP (57) ABSTRACT

An epoxy composition includes an epoxy resin, a latent curing agent, and a catalyst. The composition includes two epoxide groups per molecule, and the latent curing agent is preferably a dicyanopolyamide, and most preferably dicyandiamide. The catalyst includes 2,4-toluene bis dimethyl urea, preferably in a concentration exceeding 70% by weight. The composition can be used in prepregs. The relative concentrations of the epoxy resin, curing agent, and catalyst are selected to achieve desired properties, including specific curing times and temperatures, and glass transition temperatures that enable a cured resin composition to be removed from a mold after being heated to its curing temperature, without being cooled. Exemplary formulations have reduced cure times, at both high and low curing temperatures, as compared to prior art formulations.

81 Claims, 6 Drawing Sheets

100% 2,6-TOLUENE BIS DIMETHYL UREA

*FIG. 1A PRIOR ART*

35-100% 2,6-TOLUENE BIS DIMETHYL UREA

+

0-65% 2,4-TOLUENE BIS DIMETHYL UREA

*FIG. 1B PRIOR ART*

100% 3,4-DICHLOROPHENYL-N,N-DIMETHYL UREA (DCMU)

*FIG. 1C PRIOR ART*

100% 2,4-TOLUENE BIS DIMETHYL UREA

FIG. 4

QUICK CURE CARBON FIBER REINFORCED EPOXY RESIN

RELATED APPLICATIONS

This application is a continuation-in-part of a prior U.S. patent application Ser. No. 09/905,264, filed on Jul. 13, 2001 now abandoned, the benefit of the filing date of which is hereby claimed under 35 U.S.C. §120.

FIELD OF THE INVENTION

The present invention generally relates to single part epoxy resin compositions, and more specifically, to quick cure and low temperature cure epoxy resin formulations suitable for use in prepregs, composites, and adhesive films.

BACKGROUND OF THE INVENTION

Advanced composites are increasingly used as reinforcing components in aircraft, automotive, and sporting goods applications. Typically, these composites comprise a strengthening component, such as carbon fibers, embedded in a thermosetting resin matrix. Components fabricated from such carbon fiber reinforced resin composites are produced by impregnating oriented carbon fibers (in the form of woven carbon cloth, or continuous carbon filaments) with thermosetting resins, and arranging the filaments of carbon fibers to form prepregs. Generally, prepregs include a paper backing onto which the fiber reinforcement is laid, and the selected resin is then forced into the fibers.

Thermosetting resins, which normally include a latent curing agent that is activated by increasing the temperature of the resin over a minimum cure temperature, are often preferred over two part resin systems that cure very quickly once the two parts are mixed. This preference arises from the ease of handling of thermosetting prepregs during the manufacture of components. Thermosetting prepregs can be produced in quantity with consistent properties, and stored at cold temperatures for a considerable length of time before use. Most of these thermosetting prepregs are provided as large rolls of material that include the paper backing and the epoxy impregnated fibers. To use this material, the desired portion is simply cut from the roll. In contrast, two part resin mixtures, which admittedly often have desirable properties, such as a rapid cure time, must be used immediately after being produced. Thus, component manufacturers can only produce small batches of composite material, and must then use each batch immediately after it is mixed. Furthermore, the chance that a bad batch of composite material will be produced on a manufacturer's production line is considerably higher than in a chemical plant where the focus is on the single task of producing a prepreg. The ease of use of prepregs is such that even though the curing performance of two part resin systems is generally better than that of thermosetting resins, prepregs are almost universally preferred for fabricating composite reinforcing components.

To fabricate a reinforcing component from prepregs, manufacturers generally apply multi-layer laminates of these prepregs over existing molds. To generate a rod or shaft, the prepreg is wound around a mandrel. Once a sufficient number of laminations have been achieved, the mold is heated to the cure temperature required to activate the latent curing agent in the thermosetting resin, using an oven or autoclave. Generally, a higher temperature results in a shorter cure time, while a lower temperature requires a longer cure time.

Suitable thermosetting epoxy resins generally have more that one epoxide group per molecule. In addition to the latent curing agent, which is often a functional amine, state-of-the-art epoxy matrix resin systems used in advanced composites often employ a catalyst, which helps to reduce cure times. It should be noted that cure times are important to end users of prepregs, especially when prepregs are used in conjunction with molds. Molds can range from the simple to the complex, depending on the component being produced. To ensure a high level of production quality, a manufacturer must spend considerable time and effort to ensure that each mold is identical. Furthermore, each mold must be able to be heated to activate the prepreg, thus increasing the equipment required for each mold. For example, in a golf shaft manufacturing process, commonly used prepregs need to be cured for more than 20 minutes at 150° C. in order to be removed from the mold or mandrel without changing shape. If a manufacturer can obtain a prepreg with a cure time which is one half of a presently used product, then that the manufacturer can double production without providing additional molds. It would therefore be desirable to provide an advanced epoxy resin system that substantially reduces cure time, to enable manufacturers to increase production without providing additional molds.

Because prepregs are often used to form reinforcing components, such as parts for airplanes, the resulting components must meet high quality standards. It is desirable that any reduction in cure time not negatively affect the physical properties, such as tensile strength, of such composite components.

In addition to preferring prepregs that have shorter cure times, composite component manufacturers also desire prepregs that cure at lower temperatures, particularly manufacturers who fabricate large scale composite components, such as those that might be employed in aviation or marine applications (boat hulls, for example). Low temperature curing prepregs are desirable for manufacture of large parts because such low temperatures require less sophisticated heating systems, and much reduced energy costs, which can be significant for large scale parts. Note that one major manufacturer of prepregs, Hexcel Corporation of Dublin, Calif., currently offers a low temperature curing prepreg (M34™), which cures at 65° C. (for 16 hours) or 75° C. for 8 hours. It would be desirable to provide an advanced epoxy resin system that substantially reduces cure time below that of currently available prepregs, particularly at low cure temperatures.

Many different types of epoxy resins systems are known in the art. Different combinations of epoxy resins, curing agents, and catalysts (also known as accelerators) have been formulated. A balance of desirable properties for prepregs include the following: (1) a tacky, dough-like consistency prior to curing; (2) low reactivity at room temperature; and, (3) a high degree of cure after heating for no more than 2 hours at no more than 180° C. As noted above, the provision of a prepreg with a reduced cure time will offer component manufacturers significant efficiency advantages. Accordingly, there is an ongoing effort within the prepreg industry to produce a prepreg that has the desired consistency and low reactivity at room temperature, yet also exhibits reduced cure time at relatively low temperatures.

While certainly not an exhaustive compilation, the following patents provide examples of thermosetting resin compositions known in the art. International Patent Publication No. WO 99/36484 describes a composite system that includes an epoxy resin having two or more epoxide groups per molecule, a latent hardener and at least one solid organic acid that is substantially insoluble in the resin formulation. U.S. Pat. No. 3,759,914 (Simms) discloses an epoxy resin formulation including a polyepoxide having a plurality of epoxide groups, a latent amine curing agent and an accelerator having a defined formula. U.S. Pat. No. 3,386,956 (Nawakowski) describes an epoxy resin formulation including a primary curing agent selected from a range of bis- and polyureas, and a promoter selected from the following four compounds: dicyandiamide (DICY), stearic hydrazide, succinimide and cyanoacetamide. The function of the promoters in Nawakowski's formulations are to increase the cure rate at low temperatures (i.e. less than 187° F.). The bis-ureas described include 2,4-di (N,N-dimethylureido) toluene, also known as 2,4-toluene bis dimethyl urea.

A similar epoxy formulation is disclosed in U.S. Pat. No. 3,386,956 (Harrison), which employs a polyamine curing agent and a phenyl urea based accelerator (see also U.S. Pat. No. 3,988,257 for related methods). U.S. Pat. No. 3,956,237 (Doorakian) describes an epoxy resin formulation including a latent amine curing agent and a latent accelerator. A number of latent accelerators are disclosed, including a specific blend of different isomers of toluene bis dimethyl urea. U.S. Pat. No. 4,569,956 discloses a rapid, low temperature curing epoxy resin adhesive composition comprising a polyepoxide, a catalytic amount of $HBF_4$, a finely divided filler (preferably an acidic filler) and, optionally, a polyalkylene ether glycol. Yet another epoxy formulation is disclosed in U.S. Pat. No. 4,783,518 (Goel), which teaches a rapid curing epoxy composition including a polyepoxide, a latent amine curing agent, a novel thiocyanate salt of the reaction product of an alkylene polyamine (such as ethylene diamine) and a bicyclic amide acetal. U.S. Pat. No. 5,407,978 (Bymark) describes an epoxy formulation which includes a dihydric bisphenol curing agent and a immidazole based accelerator to increase the cure rate. As a final example, U.S. Pat. No. 5,599,629 (Gardner) describes an epoxy resin formulation including a resin with at least three epoxide groups per molecule and a specific aromatic amine latent curing agent, the aforementioned formulation being specifically employed to produce prepregs.

While the above-cited references all assert that a functional formulation having desirable properties is achieved, composite component manufacturers still desire a prepreg material having faster cure times, and/or lower cure temperatures. It would be desirable to provide an epoxy formulation differing from those described in the prior art, that is adaptable to being employed as a prepreg, and which provides shorter cure times and lower cure temperatures than existing prepregs provide.

It should be noted that several different methods can be used to fabricate prepregs, including a solventless, hot melt impregnation method, and a solvent method. In a typical hot melt impregnation process, continuous sheets of resin matrix film supported by release paper are impregnated into fiber sheets under heat, pressure, and tension. The matrix has to have a certain viscosity at impregnation temperature so that the resin can wet-up the fiber. Furthermore, specific tack, drape, and shelf-life characteristics are required when utilizing the hot melt method. In contrast, a solvent-diluting impregnation method does not have such strict requirements. However, a superior prepreg is often achieved by the hot melt method, because micro-voids, caused by off gassing of volatile solvent, are often observed in prepregs prepared by the solvent-diluting impregnation method. It would be desirable to provide an advanced epoxy resin system adaptable to be employed to produce a prepreg, which substantially reduces cure time, that can be used with either the hot melt impregnation method or the solvent based impregnation method.

In addition, it should be noted that the time required for a prepreg to cure is not always the limiting factor determining when the cured prepreg can be removed from a mold. For example, a commonly utilized prepreg material is produced from an epoxy formulation including epoxy resin A (a diglycidyl ether of bisphenol A having an epoxide equivalent weight (EEW) of 176), epoxy resin B (a diglycidyl ether of bisphenol A having an EEW of 1200–1400), a thermoplastic additive (PVF powder), a DICY curing agent, and a catalyst (3,4-dichlorophenyl-N,N-dimethylurea, available as DYHARD UR200™, made by SKW Trostberg). Depending on the specific proportions of the above ingredients employed, it is possible to produce a prepreg whose glass transition temperature (Tg) is significantly lower (20° C.) than the optimal cure temperature. For instance, manufacturers of composite shafts frequently employ mold temperatures of 300° F.–310° F. (147° C.–153° C.) to obtain rapid cure times. However, such temperatures are generally above the Tg of the resin component, and while the resin component is fully cured, it will be too soft to be removed from the mold. In such cases, a manufacturer must cool the mold below the Tg before removing the cured component from the mold. This cooling step is an additional, undesirable step, which increases the time required to produce a component, lowers the number of components that can be produced by a mold during a work cycle, and undesirably increases costs. It would therefore be desirable to provide an epoxy resin formulation, suitable for making prepregs, that exhibits reduced cure times, and having a cure temperature that is either less than or about (within 10° C. of) the Tg of the cured prepreg material. While high temperature curing resin systems are known, which have a cure temperature that is less than the Tg of the cured resin, such resin systems require long (in excess of two hours) cure times. The prior art does not teach or suggest a rapid curing epoxy resin formulation whose cure temperature is sufficiently close to the Tg of the cured resin so that cooling of the mold is not required.

It would further be desirable to provide an epoxy resin formulation that is not only suitable for making prepregs, but which can also be beneficially employed to fabricate thermosetting resin adhesive film products by coating a relatively thin layer of resin onto a backing material, such as paper or film. Such a thermosetting resin adhesive film product will desirably have good workability at room temperature, and be activated by exposure to an appropriate temperature condition.

SUMMARY OF THE INVENTION

In accord with one aspect of the present invention, a resin matrix composition is defined that includes an epoxy resin having, on average, at least two epoxide groups per molecule, and a catalyst including 2,4-toluene bis dimethyl urea. The amount of 2,4-toluene bis dimethyl urea in the catalyst preferably comprises at least 70% (by weight), still more preferably at least 95 wt %, and most preferably 100%. Such a composition preferably also includes at least one latent curing agent. In at least one embodiment, the at least one latent curing agent is an amine type curing agent, preferably a dicyanopolyamide, most preferably DICY. The viscosity of the composition is preferably less than 20,000 poise at 40° C.

According to an embodiment of the invention, the matrix composition is curable, preferably to at least a 95% cure, (i) on heating to a temperature of 150° C. for 3 minutes, to provide a composition having a glass transition temperature of at least, and preferably higher than, 140° C.; and/or (ii) on heating to a temperature of 80° C. for 5 hours, to provide a composition having a glass transition temperature of at least, and preferably higher than, 100° C.

Such compositions may include an epoxy resin having an average of at least two epoxy groups per molecule. The epoxy resin can be a blend of different epoxy resins, where the blend includes at least one bisphenol component, preferably bisphenol A. Each bisphenol component preferably has an EEW of from 150 to 1500, preferably 170 to 1400. Such a composition will also include a catalyst, where the catalyst includes at least 70% (by weight), and more preferably at least 95% (by weight) 2,4-toluene bis dimethyl urea.

In at least one embodiment, the composition further includes at least one thermoplastic additive. Preferably the thermoplastic additive is selected from polyvinylformals (PVFs) (more preferred), polymethylmethacrylates (PMMAs), polyarylethersulfones (PESs), polysulfones (PSFs), polyimides (PIs), polyetherimides (PEIs) and polyethylene oxides (PEOs).

Preferably the epoxy resin utilized in such compositions include at least one epoxy resin component selected from bisphenol-based epoxy resins (for example, bisphenol A based epoxy resins or bisphenol F based epoxy resins), epoxy phenol novolacs, trifunctional epoxy resins, tetrafunctional epoxy resins, and halogenated derivatives thereof. More preferably the epoxy resin includes diglycidyl ethers of bisphenols (examples of which are bisphenol A and bisphenol F), epoxy phenol novolacs, trifunctional epoxy resins, tetrafunctional epoxy resins and halogenated derivatives thereof.

When the epoxy resin includes at least one bisphenol, each bisphenol component preferably has an EEW of from 150 to 1500, more preferably from 170 to 1400. A preferred bisphenol component is bisphenol A. The epoxy resin may consist of a bisphenol, especially bisphenol A, having an EEW of from 150 to 1500, preferably from 170 to 1400.

A bisphenol resin component may be a blend of a first bisphenol epoxy resin (especially bisphenol A) having an EEW in the range of from 150 to 1500, more preferably from 170 to 195, and still more preferably from 180 to 195, and a second bisphenol (especially bisphenol A) epoxy resin having an epoxy equivalent in the range of from 400 to 1500, preferably from 1200 to 1400. Note the amount and the equivalent weight of the second epoxy resin are controlled so that the blended bisphenol-based epoxy resin has an average EEW in the range of 200 to 800, and more preferably, in the range of 200 to 300.

Useful amounts of catalyst and curing agents range from 0.5 to 10 parts per hundred parts epoxy resin (phr). Most preferably, the amount ranges from 2 to 5 phr. In at least one embodiment, the composition of the present invention is at least 95% cured after being heated to 150° C. for at least 3 minutes, preferably no more than five minutes, and/or at least 95% cured after being heated to 120° C. for no more than 20 minutes. Preferably, after being cured at 150° C., the composition has a $T_g$ that is at least, preferably higher than 140° C., such that the composition does not need to be cooled before being removed from a mold.

In one embodiment, a preferred resin matrix composition includes an epoxy resin, a latent amine curing agent, and a catalyst that includes 2,4-toluene bis dimethyl urea in an amount of at least 70% (by weight). More preferably the amount of 2,4-toluene bis dimethyl urea is at least 95% (by weight). In at least one particularly preferred embodiment the catalyst consists of 2,4-toluene bis dimethyl urea. A preferred epoxy resin is made from a diglycidyl ether of a bisphenol, which has an average epoxy equivalent weight of from 200 to 800 and preferably has an average molecular weight in the range of from 200 to 300.

In other, various preferred embodiments of the present invention, the resin matrix composition includes a blended epoxy resin, a latent curing agent (preferably an amine curing agent), and a catalyst that includes 2,4-toluene bis dimethyl urea. The specific epoxy blends can include:

(a) a mixture of a diglycidyl ether of a bisphenol, especially bisphenol A, having an EEW of 150–195, typically 176, and a diglycidyl ether of a bisphenol, especially bisphenol A having an EEW of 400–1500, preferably 1200–1400;

(b) a mixture of a diglycidyl ether of a bisphenol, especially bisphenol A, having an EEW of 150–195, typically 176, a diglycidyl ether of a bisphenol, especially bisphenol A, having an EEW of 400–1500, preferably 1200–1400, and an epoxy phenolic novalac resin with a functionality of 2.2 to 4, typically 3.6 or above, having an EEW of 170–190, preferably 174–180; and (c) a mixture of a diglycidyl ether of a bisphenol, especially bisphenol A, having an EEW of 150–195, typically 176, a diglycidyl ether of a bisphenol, typically bisphenol A, having an EEW of 400–1500, preferably 1200–1400, and a tetra-functional epoxy having an EEW of 117–134.

Still another aspect of the present invention is a prepreg, substantially similar to the resin compositions described above, and further including a plurality of reinforcing fibers. The epoxy composition includes an epoxy resin having, on average, at least two epoxide groups per molecule, preferably a latent curing agent, more preferably a latent amine-type curing agent, and a catalyst including 2,4-toluene bus dimethyl urea. The catalyst preferably includes (by weight of total catalyst) at least 70% 2,4-toluene bus dimethyl urea, and more preferably at least 95% 2,4-toluene bus dimethyl urea. A most preferred catalyst is 100% 2,4-toluene bis dimethyl urea. In at least one embodiment, the epoxy composition used in the prepreg include a thermoplastic additive, such as PVFs, PMMAs, PESs, PSF, PIs, PEIs, and PEOs.

A preferred prepreg embodying the present invention additionally includes a polyvinyl formal dissolved into the epoxy composition. The reinforcing fiber of such a prepreg can include at least one of glass fibers, aramid fibers and graphite fibers. The fibers can be introduced as woven fibers, matted fibers, and unidirectional fibers.

A preferred prepreg embodying the present invention includes an epoxy resin composition having at least two epoxide groups per molecule, preferably a latent amine curing agent, a catalyst agent as defined above for reducing the cure time provided by the latent amine curing agent, and a reinforcing fiber. Such a prepreg has a gel time of less than 1.5 minutes at 150° C., and a glass transition temperature of no less than 140° C. when heated to a temperature of 150° C. Such prepregs may reach a 95% cure after less than five minutes when heated to a temperature of 150° C. and reach a 95% cure after less than 20 minutes when heated to a temperature of 120° C. Other preferred prepregs embodying the present invention are characterized by requiring no more than three minutes to reach a 95% cure at 150° C. Furthermore, such prepregs may have a glass transition temperature of no less than 142° C. when heated to a temperature of 150° C.

Preferred prepregs in accord with the present invention include an epoxy resin having at least two epoxide groups per molecule, preferably a latent amine curing agent, a catalyst agent as defined above for reducing the cure time provided by the latent amine curing agent, and a reinforcing fiber. Again, the relative proportions of the prepreg components can be controlled to achieve specific properties, such as those specified above. Additional desired properties include a gel time of less than 1.5 minutes at 150° C., and a glass transition temperature of no less than 140° C. when heated to a temperature of 150° C. Such prepregs may reach a 95% cure after less than five minutes when heated to a temperature of 150° C. and reach a 95% cure after less than 20 minutes when heated to a temperature of 120° C.

Other preferred prepregs embodying the present invention are characterized by requiring no more than three minutes to reach a 95% cure at 150° C. Furthermore, such prepregs have a glass transition temperature of no less than 142° C. when heated to a temperature of 150° C.

Preferred prepregs embodying the present invention have a glass transition temperature, when 95% cured, which enable the cured prepreg to be removed from a mold without cooling, in either or both low and high temperature curing.

Another aspect of the present invention is a method by which the time required for a thermosetting epoxy resin formulation to reach at least a 95% cure is decreased. The method steps include providing an epoxy composition having epoxy resin with at least two epoxide groups per molecule, and preferably a latent curing agent, more preferably a latent amine-type curing agent. The method requires adding at least 0.5 phr of a catalyst to the epoxy composition, the catalyst reducing the time required to reach a 95% cure. The catalyst comprises 2,4-toluene bis dimethyl urea, preferably in an amount, by weight of total catalyst, of at least 70 wt %, more preferably at least 95 wt %, and still more preferably consisting of 2,4-toluene bis dimethyl urea. The resulting mixture is then heated to a curing temperature, and the presence of the catalyst reduces the time required to reach a 95% cure. Preferably, the step of heating includes selecting a curing temperature such that a glass transition temperature of the epoxy composition when 95% cured and at the curing temperature enables a 95% cured epoxy composition to be removed from a mold without requiring the composition to be cooled before being removed from that mold. More preferably, the glass transition temperature is either greater than the curing temperature, or no more than 10° C. less than the curing temperature. Generally, the epoxy compositions also include a reinforcing fiber. The curing temperature is preferably at least 70° C., more preferably at least 80° C., still more preferably at least 120° C., especially at least 150° C.

Another aspect of the present invention is directed to an article resulting from curing a resin composition or prepreg as described above, which also preferably includes a reinforcing agent. More preferably the reinforcing agent is at least one reinforcing fiber component selected from glass fibers, aramid fibers and graphite fibers, which fibers optionally take the form of at least one fibrous material selected from woven fibers, matted fibers and unidirectional fibers. Still more preferably, the composition takes the form of at least one prepreg, as described above.

According to yet another aspect of the present invention there is provided a carbon fiber reinforced epoxy resin article, superior in mechanical properties, resulting from curing of the prepregs described above.

According to a still further aspect, the present invention provides an adhesive film, superior in handling and curing properties, resulting from depositing a thin layer of the epoxy resin formulation described above onto a substrate.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Overview of the Present Invention

The present invention provides a thermosetting epoxy composition including an epoxy resin, preferably a latent curing catalyst, more preferably a latent amine-type curing agent, and a specific urea-type catalyst. The epoxy composition of the present invention can offer significantly reduced cure times as compared to the cure times of epoxy resin compositions described in the prior art. This reduction in cure times is achievable across a wide range of temperatures, such that the present invention can be employed in a low temperature (i.e., no more than, and preferably less than, 85° C.) cure environment, as well in high temperature cure environments (i.e., at least, and preferably greater than, 140° C.). The epoxy composition of the present invention is suitable for use as a prepreg composition. When used as a prepreg, reinforcing fibers as well as specialty fillers can be included to enhance the physical properties of the cured resin. Significantly, a glass transition temperature of a 95% cured resin composition produced in accord with the present invention is sufficient that even during high temperature, fast cure applications, the 95% cured resin does not need to be cooled prior to being removed from a mold. Thus, the use of the prepregs formed in accord with the present invention enables composite component manufacturers to increase production rates without requiring additional molds be provided, by offering reduced cure times as well as eliminating the need to cool a cured resin component prior to removing it from a mold.

Preferably the epoxy resin includes at least two, and most preferably two, epoxide groups per molecule, and the latent amine curing agent is a dicyanopolyamide, most preferably DICY. It should be noted that diaminodiphenyl sulfone (DDS) can also be beneficially employed as a latent amine curing agent, as well as mixtures of DICY and DDS. The specific catalyst is 2,4-toluene bis dimethyl urea. While other resin compositions are known in which 2,4-toluene bis dimethyl urea is employed alone or in conjunction with additional catalysts, the use of 2,4-toluene bis dimethyl urea with the specific epoxy resins disclosed below provides a startling and unexpected reduction in the curing time for prepregs. For example, a prepreg employing the epoxy composition of the present invention can achieve a 95% cure in about one half of the time required by a prepreg that differs only in the catalyst employed.

The prepregs used in the present invention are most preferably prepared by the solventless, hot-melt impregnation method to avoid the formation of microvoids caused by residual volatile solvent, which are sometimes observed in prepregs prepared by the solvent-diluting impregnation method. However, the present invention can be implemented in accord with the solvent-diluting method, as well.

Suitable resin compositions for the prepreg material of the present invention may be selected from among those discussed below. Generally suitable epoxy resins have at least two epoxide group per molecule. Such resins include, for example, diglycidyl ethers of bisphenols, such as bisphenol A and bisphenol F, epoxy phenol novolacs, trifunctional epoxy resins, tetrafunctional epoxy resins, as well as the halogenated derivatives thereof. Chlorine and bromine are the most common halogens used to form such derivatives. Brominated epoxy can add anti-flammability to the composition. The epoxy resins include diglycidyl ethers having an average of not more than two vicinal epoxy groups per molecule.

As noted above, the preferred latent curing agent is DICY, which is employed in amounts from 4 to 8 phr, most preferably in amounts from 5 to 7 phr. A key element of the present invention is the use of a specific urea-based catalyst or accelerator. It should be noted that the term catalyst and accelerator are both employed in the art to describe an ingredient that reduces curing time. While the latent amine curing agent is still responsible for the curing process, the presence of small amounts of catalysts or accelerators can significantly reduce cure times. Thus, it should be understood that the terms "catalyst" and "accelerator," as used herein and in the claims that follow, refer to a chemical agent that reduces a cure time achievable with a curing agent alone. The specific urea catalyst employed in the present invention to achieve the previously unexpected reduction in curing time is 2,4-toluene bis dimethyl urea. Although this catalyst may be employed in the presence of another catalyst, notably another urea-type catalyst, it is preferred that the catalyst comprises at least 70 wt %, more preferably at least 95 wt % by weight of total catalyst, of 2,4-toluene bis dimethyl urea and more preferably consists essentially only of 2,4-toluene bis dimethyl urea. This compound, whether as a catalyst component or, as is especially preferred, as a sole catalyst, is preferably employed in amounts of 0.5 to 10 phr, more preferably in amounts from 2 to 5 phr, and most preferably in amounts from 3 to 5 phr.

Also as noted above, suitable thermoplastic additives can be added to prepregs made from the resin composition of the present invention. Such thermoplastic additives can include any one or more of PVFs, PMMAs, PESs, PSFs, PIs, PEIs, PEOs. More preferred thermoplastic additives include PVFs and PESs. The most preferred thermoplastic additives include PVFs. The thermoplastic additives, when present, may be employed in any amount up to 8% by weight (based upon the weight of total blended composition). More preferred amounts range from 1 to 4%, and most preferred amounts range from 2.5 to 3.5% by weight.

It should also be noted that elastomeric additives can be added to prepregs made from the resin composition of the present invention. Such elastomeric additives can include any one or more of natural latex rubbers, synthetic latex rubbers, silicones and other elastomers. The elastomeric additives are generally employed in amounts of no more than, and preferably, less than, 10% by weight (based upon the weight of total blended composition). In addition, hardened thermosetting resin additives may be included in the prepregs.

Any one or more of such additives, for example, the thermoplastic resin, the hardened thermosetting resin and the elastomer additives, may be incorporated as organic particles, preferably fine organic particles. The size of the particles is preferably no more than 100 μm, preferably 5–50 μm. These particles are effective for improving the toughness of the resin and improving the impact resistance of the fiber reinforced composite. Such organic particles are generally employed in amounts of no more than, preferably less than, 20% by weight (based upon the weight of total blended composition).

The thermoplastic resins which can preferably be used as the organic particles described above include polyamides. The thermosetting resins which can be preferably used as the organic particles described above include epoxy resins and phenol resins. Known polyamide particles include SP-500, produced by Toray Industries, Inc. and "Orgasole" produced by Atochem.

Elastomer particles which can be preferably used as the organic particles described above include crosslinked rubber particles, and core-shell type rubber particles obtained by graft-polymerizing a different polymer on the surfaces of crosslinked rubber particles. Known crosslinked rubber particles include XER-91 (produced by Japan Synthetic Rubber Co., Ltd.), which is a crosslinked carboxyl modified butadiene-acrylonitrile copolymer; and the CX-MN series (Nihon Shokubai K.K.) and the YR-500 series (produced by Tohto Kasei K.K.), each of which comprise fine acrylic rubber particles.

Known core-shell type rubber particles include "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers.

Furthermore, for rheological control of the resin compositions of the present invention, inorganic fine particles such as finely powdered silica can be incorporated into the resin composition within a range from 0.01% to 5%, preferably from 0.02% to % by weight (based upon the weight of total blended composition), such that the toughness and elongation of the cured material is not impaired.

It is anticipated that a particularly useful prepreg can be obtained by adding a reinforcing material to the resin composition of the present invention. Suitable fibrous reinforcing materials may be in the form of fabric or a plurality of unidirectional fibers. Such reinforcing materials include glass fibers, aramid fibers and/or carbon fibers.

The resin formulations of the present invention can also be beneficially employed to produce adhesive films. To produce such an adhesive film, a thin layer of a resin formulation in accord with the present invention is deposited upon a supporting material. Suitable supporting materials include polyester and polyamide.

Figure 1A:
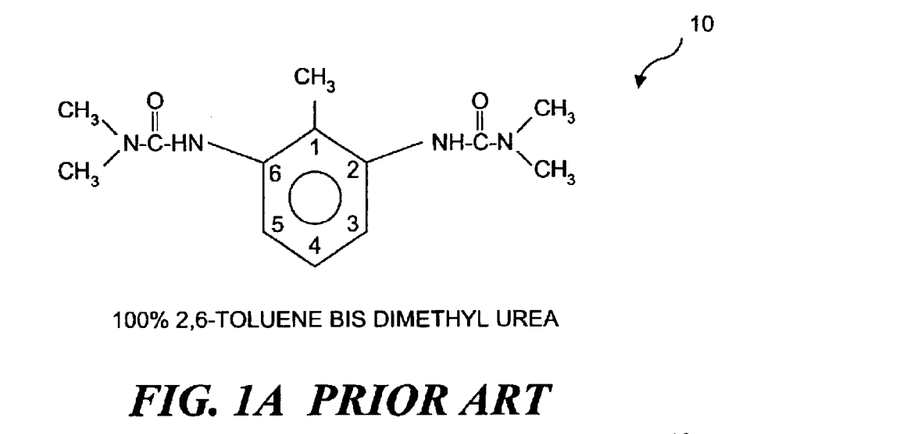
FIGS. 1A–1C (Prior Art) illustrate the chemical structures of exemplary epoxy curing accelerators.

As noted above, it is known in the prior art to employ urea-based catalysts to reduce the curing time achievable with latent amine curing agents alone. FIG. 1A illustrates a chemical structure 10 representing one such urea based catalyst, 2,6-toluene bis dimethyl urea. The use of this catalyst is described in U.S. Pat. No. 3,956,237, entitled "EPOXY RESIN COMPOSITIONS COMPRISING LATENT AMINE CURING AGENTS AND NOVEL ACCELERATORS," filed Jul. 8, 1974. In addition to describing the use of 2,6-toluene bis dimethyl urea as a catalyst that is used alone, this patent also discloses employing a combination of both 2,6-toluene bis dimethyl urea and 2,4-toluene bis dimethyl urea as a catalyst.

Figure 1B:
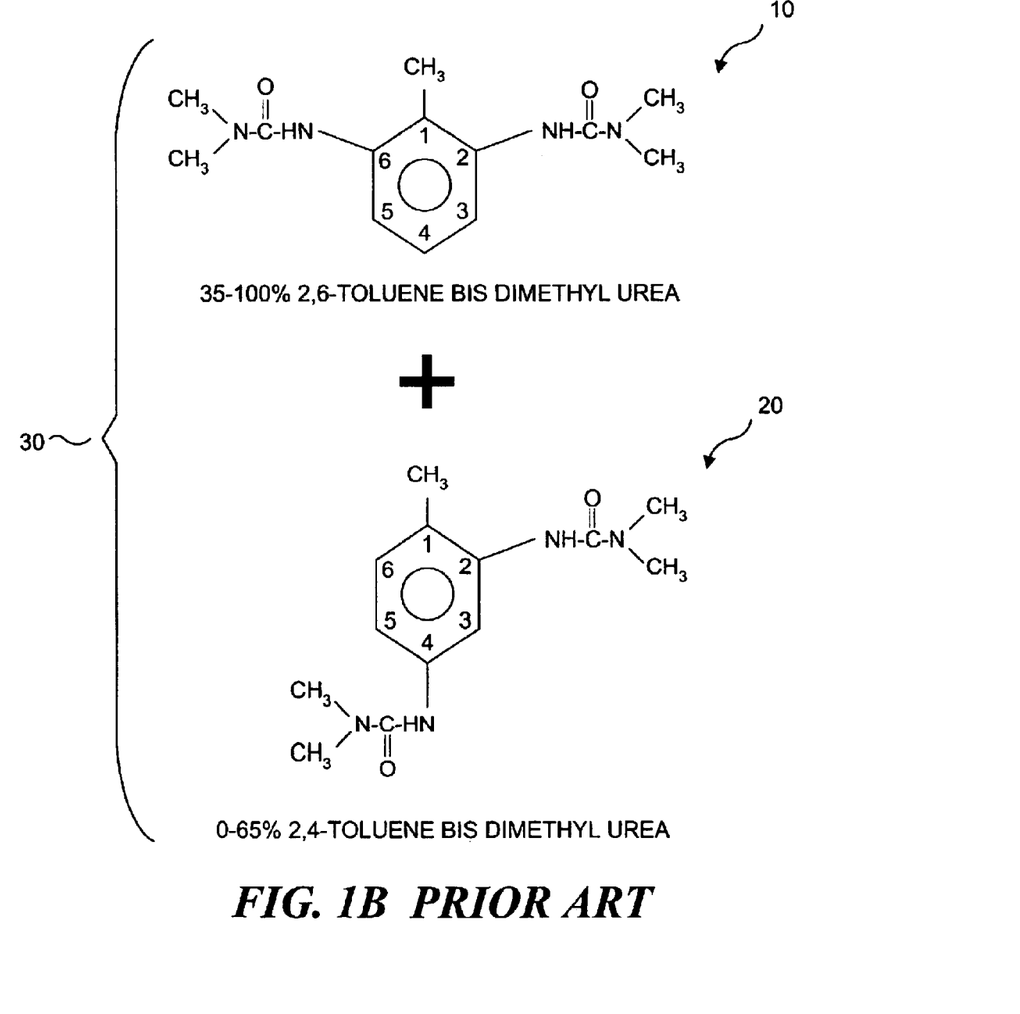

The reference teaches the use of 35–100% 2,6-toluene bis dimethyl urea, and 0–65% of 2,4-toluene bis dimethyl urea as a catalyst and exemplifies a resin composition wherein the catalyst component includes 35% 2,6-toluene bis dimethyl urea and 65% 2,4-toluene bis dimethyl urea. FIG. 1B shows such a catalyst mixture, including a chemical structure 20 of 2,4-toluene bis dimethyl urea, as well as a chemical structure 10 for 2,6-toluene bis dimethyl urea, and the disclosed percentages. Significantly, however, the '237 patent does not disclose the use of 100% 2,4-toluene bis dimethyl urea as a catalyst.

Figure 1C:
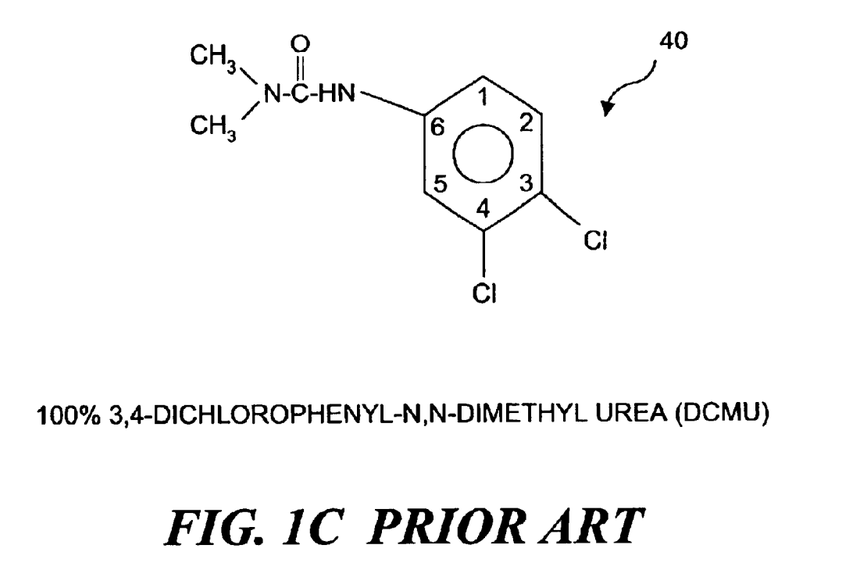

FIG. 1C illustrates a chemical structure 40 for another catalyst known in the prior art, 100% 3,4-dichlorophenyl-N,N-dimethyl urea (DCMU). This catalyst, which is sold under the name of DYHARD UR200™ by SKW Trostberg, (Trostberg, Germany) was used to fabricate a control sample identical to a test batch of the preferred embodiment of the present invention except for the catalyst employed. As the following examples will show, the present invention provides both high temperature and low temperature cure times that are about one half of the cure times achieved when DCMU is employed as a catalyst.

Figure 1D:
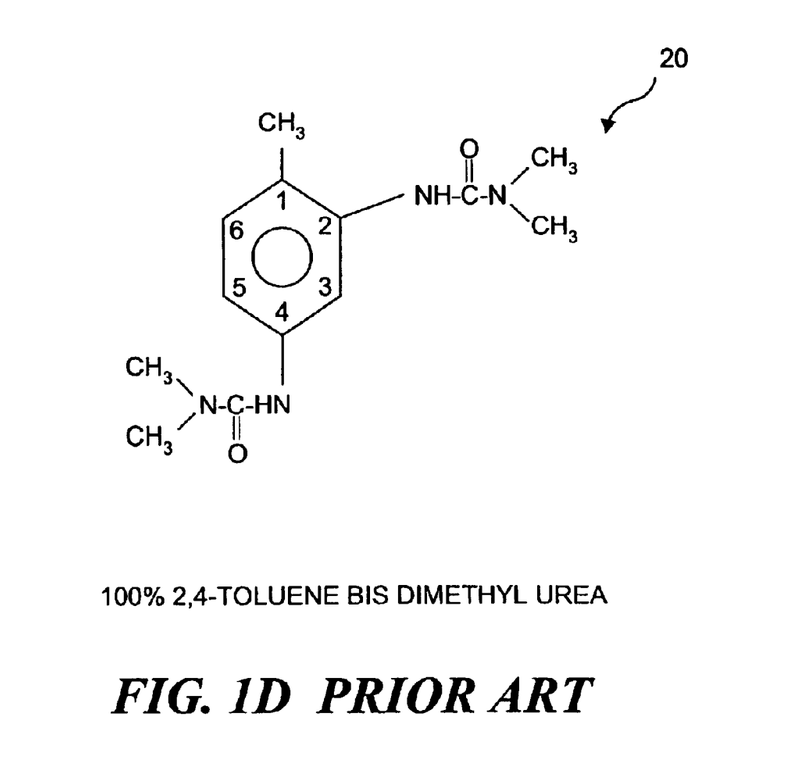
FIG. 1D (Prior Art) illustrates the chemical structure of the catalyst used in a resin composition of the present invention.

FIG. 1D illustrates the chemical structure of the commercially available catalyst present in a composition of the present invention, 100% 2,4-toluene bis dimethyl urea. This catalyst is sold as OMICURE U-24™ by CVC Specialty Chemicals, Inc. U.S. Pat. No. 3,386,956, entitled "LOW TEMPERATURE CURABLE EPOXY RESIN ADHESIVE COMPOSITIONS WITH LONG STORAGE STABILITY," discloses the use of 2,4-toluene bis dimethyl urea as a catalyst, combined with DICY and polyepoxides to provide a resin formulation that reaches a 76% cure after 90 minutes at temperature of 187° F. (87° C.). Significantly, however, this patent does not teach or suggest that employing 2,4-toluene bis dimethyl urea as a catalyst will provide a fast curing epoxy resin formulation at elevated temperatures (in excess of 87° C.). Furthermore, while the '956 patent discloses that many types of polyepoxide resins can be employed for the resin component portion of the formulation containing a polyepoxide resin, DICY and a 2,4-toluene bis dimethyl urea catalyst, no specific class of epoxies are identified that provide a more rapidly curing epoxy formulation, and which provide rapid curing at both high and low temperatures.

The present invention arises from a discovery that epoxy resin formulations comprising polyepoxide resin, DICY and a 2,4-toluene bis dimethyl urea catalyst can be employed to provide a fast curing resin at higher temperatures than reported in the art, and that specific blends of polyepoxides enable a substantial improvement over the 90 minute, 74% cure rate reported in the prior art to be achieved. Moreover, for both low and especially high temperature curing, a cured resin having a high Tg (at least 100° C. when curing at 80° C. for 5 hours and at least 140° C. when curing at 150° C. for 3 minutes) can be obtained.

As will be detailed below, one embodiment of the present invention is an epoxy resin formulation comprising a specific blend of polyepoxides, DICY, and a 2,4-toluene bis dimethyl urea catalyst that obtains a 95% cure at 130° C. in 19 minutes, and a 95% cure at 150° C. in as little as 3 minutes.

A resin composition in accord with the present invention that is suitable for high temperature curing is cured by heating at 150° C. for as little as 3 minutes, to provide a resin composition having a glass transition temperature of at least 140° C., preferably at least 142° C. Such a resin composition is heated to 150° C. for 3 to 120 minutes, more preferably 3 to 60 minutes, and most preferably for 3 to 20 minutes. Such resin compositions reach a glass transition temperature of at least 140° C., preferably higher than 140° C., more preferably at least 142° C., and most preferably 142–150° C.

A resin composition in accord with the present invention that is suitable for low temperature curing (whose composition may be the same as or different from the composition suitable for high temperature curing) can be cured upon heating at 80° C. in as little as 5 hours, to provide a composition having a glass transition temperature of at least 100° C., more preferably at least 118° C., still more preferably higher than 118° C. While such a low temperature curing resin composition can be cured at 80° C. in as little as 5 hours, in general such a resin composition is cured for 5 to 16 hours, more preferably for 5 to 12 hour, and most preferably for 5 to 8 hours, wherein such curing times enable a glass transition temperature of at least 100° C., preferably higher than 100° C., to be reached.

Furthermore, one unique aspect of the present invention is the ability to produce prepreg formulations that can be cured at high temperatures, wherein such high temperatures are very close to the glass transition temperature ($T_g$) of the formulation. In some prior art formulations, the high temperatures required for a rapid cure time have been so much higher (greater than 13° C.) than the $T_g$ of the prior art formulations that such resin compositions normally required cooling before being removed from a mold. As the examples provided below show, the present invention yields a faster curing resin (about 3 minutes instead of about 7 minutes required using a conventional resin that employs DCMU as a catalyst), with a smaller difference between $T_g$ and the cure temperature. Thus, it is not necessary to first cool a component fabricated from the cured resin of the present invention before removing the component from a mold.

It is anticipated that the rapid curing/high temperature curing resin composition and prepregs of the present invention can be used to produce sporting goods, automobile components, aerospace components, and marine components. It is further anticipated that the known epoxy resin formulation disclosed in the '956 patent referenced above (which discloses the use of 2,4-toluene bis dimethyl urea as a catalyst, combined with DICY and polyepoxides) can be cured at high temperatures (i.e. over about 120° C.) much more rapidly, and more completely, than the 76% cure after 90 minutes (at temperature of 187° F./87° C.) disclosed in the '956 patent.

A class of epoxy resins employed in a preferred composition in accord with the present invention is that of epoxy resins including at least one bisphenol-based epoxy resin component, each bisphenol component having an EEW of from 150 to 1500, and more preferably from 170 to 1400.

Preferred sub-classes of epoxy resins include:
 (a) mixtures of a diglycidyl ether of a bisphenol, especially bisphenol A, having an EEW of 150–195, most preferably 176, and a diglycidyl ether of a bisphenol, especially bisphenol A, having an EEW of 400–1500, preferably 1200–1400;
 (b) mixtures of a diglycidyl ether of a bisphenol, especially bisphenol A, having an EEW of 150–195, typically 176, a diglycidyl ether of a bisphenol, especially bisphenol A, having an EEW of 400–1500, preferably 1200–1400, and an epoxy phenolic novalac resin with a functionality of 2.2 to 4, typically 3.6–4, having an EEW of 170–190, preferably 174–180; and (c) mixtures of a diglycidyl ether of a bisphenol, especially bisphenol A, having an EEW of 150–195, typically 176, a diglycidyl ether of a bisphenol, typically bisphenol A, having an EEW of 400–1500, preferably 1200–1400, and a tetra-functional epoxy having an EEW of 117–134.

The following epoxy resins are employed in the examples discussed below. It should be noted that these specific blends of epoxy resins are not suggested by the prior art, and empirical data indicates that these specific blends provide surprisingly faster cure times than suggested by the prior art in regard to epoxy compositions employing different epoxy resin components. Furthermore, the resin formulations identified below are expected to have viscosities that are less than 20,000 poise. Epoxy formulations of less than 20,000 poise are preferred, as such viscosities have favorable properties such as tackiness, which is useful for compositions to be employed as prepregs or adhesive films. It is anticipated that other epoxy formulations than those specifically enumerated below can be beneficially employed in the present invention, if such formulations have a viscosity of less 20,000 poise. In addition to having a particular viscosity, it is also preferred for formulations in accord with the present invention to have an average molecular weight of around 200–300. To achieve this desired range, a quantity of a relatively high molecular weight resin (i.e., a molecular weight over 1,000) will be mixed with an appropriate quantity of a relatively low molecular weight resin (i.e., a molecular weight less than 200).

Epoxy resin A is a diglycidyl ether of bisphenol A having an EEW of 176 (sold as Epon™ 828, made by Resolution Performance Products). It is anticipated that diglycidyl ethers of bisphenol A having EEW of 170–195 can also be beneficially employed.

Epoxy resin B is a diglycidyl ether of bisphenol A having an EEW of 1200–1400 (sold as Epon™ 2005, made by Resolution Performance Products).

Epoxy resin C is an epoxy phenolic novalac resin with a functionality of above 3.6, having an EEW of 174–180 (sold as Epon™ 1050, made by Resolution Performance Products).

Epoxy resin D is a tetra-functional epoxy having an EEW of 117–134 (sold as ELM434, made by Sumitomo Chemical Co., Ltd.).

Epoxy resin E is a brominated diglycidyl ether of bisphenol A having EEW of 380–410 (sold as Epon™ 1163, made by Resolution Performance Products).

Thermoplastic additive is PVF powder (sold as Vinylek™ type K, made by Chisso K. K.).

Curing agent is DICY (sold as Amicure® CG1400, made by Air Products and Chemicals Inc.).

Catalyst is 2,4-toluene bis dimethyl urea (sold as OMICURE U-24™, made by CVC Specialty Chemicals, Inc.), referred to below as U24.

Catalyst in the control resin composition is 3,4-dichlorophenyl-N,N-dimehtylurea (sold as DYHARD UR200™, made by SKW Trostberg), referred to below as UR200.

EXEMPLARY EPOXY COMPOSITIONS 1–6

Epoxy resin compositions described in Examples 1–6 were prepared by blending 100 parts of epoxy resin A and B (divided as shown in Table 1), 3.4 parts of PVF, and 5 parts of DICY with 0.5, 1, 2, 3, 4, and 5 parts of U-24, respectively. The gel time of each composition was determined by a gel machine at 150° C. Resin samples of each composition were cured at 150° C. for 15 minutes in an oven. The cured resin $T_g$ was determined by dynamic mechanic analysis (DMA) on an Alpha Technologies Model APA 2000 instrument.

TABLE 1

| | Composition No./Amount (parts) | | | | | |
|---|---|---|---|---|---|---|
| | 1 | 2 | 3 | 4 | 5 | 6 |
| Epoxy Resin A | 76.4 | 76.4 | 76.4 | 76.4 | 76.4 | 76.4 |
| Epoxy Resin B | 23.6 | 23.6 | 23.6 | 23.6 | 23.6 | 23.6 |
| PVF | 3.4 | 3.4 | 3.4 | 3.4 | 3.4 | 3.4 |
| DICY | 5.0 | 5.0 | 5.0 | 5.0 | 5.0 | 5.0 |
| U24 | 0.5 | 1 | 2 | 3 | 4 | 5 |
| Gel Time @ 150° C. (min.) | 6.4 | 3.3 | 2.2 | 1.8 | 1.6 | 1.3 |
| $T_g$ by DMA (° C.)(Max G") | 118 | 128 | 140 | 144 | 140 | 141 |

Figure 2:
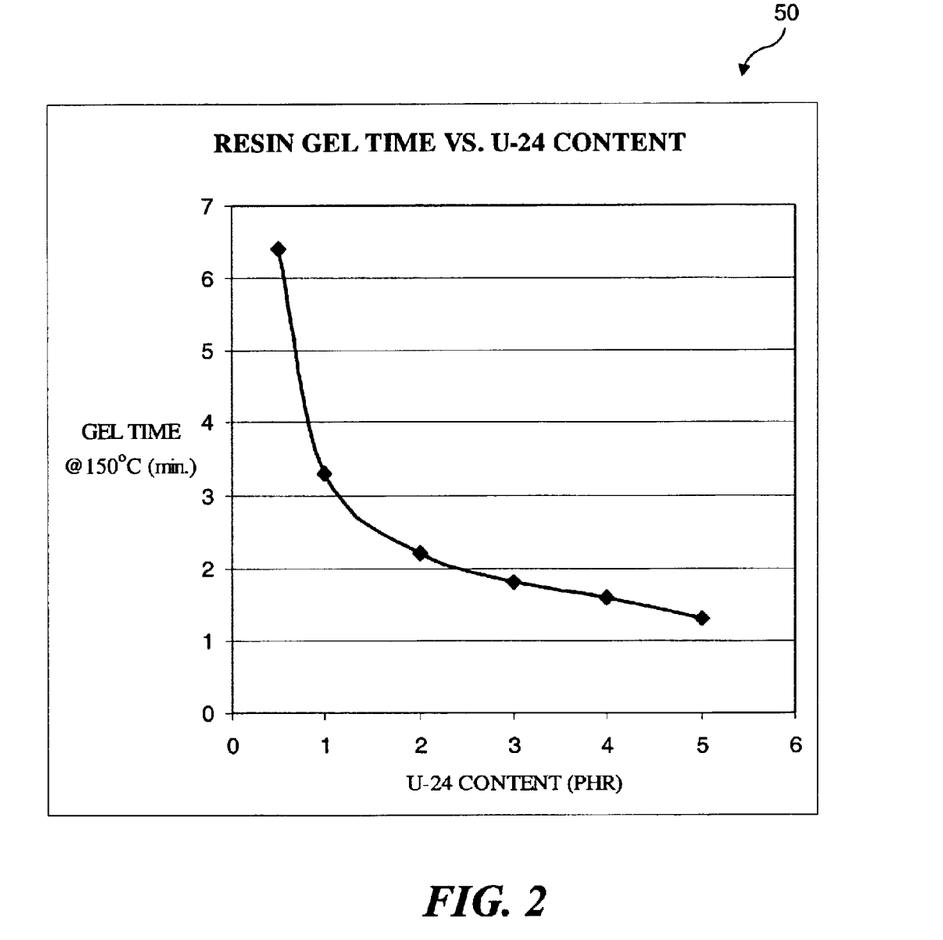
FIG. 2 is a graph showing the relationship between gel time and catalyst content when preferred resin compounds are mixed with the catalyst of FIG. 1D in accord with the present invention.

FIG. 2 illustrates a graph showing the relationship between U-24 content and gel time.

EXEMPLARY EPOXY COMPOSITION 7

An epoxy resin composition having the following formulation was prepared by blending 100 parts of epoxy A and B (in the relative amounts shown in Table 2), 3.4 parts of PVF, 5 parts of DICY, with 4.2 parts of U-24. The viscosity of the resin or resin mixture was determined by a Rheometric Model ARES plate rheometer running from 40° C. to 160° C. at 2° C./minute temperature ramp, and at a 10 rpm frequency. The heat stability was determined by the viscosity increase versus the time at 70° C. The gel time was determined by a gel machine. Digital Scanning Calorimetry was utilized to monitor the time to reach 95% cure. The total heat detected during the DSC measurement is identified to the heat evolved by the curing reaction when resin was heat from 10° C. to 225° C. at 10° C./min rate. The degree of curing was given by:

Cure %=[(ΔHi−ΔHe)/ΔHi]×100 where ΔHi is the heat generated by the uncured resin heated from 10° C. up to fully cured at 225° C. and ΔHe the heat generated by the certain degree cured resin heated up to fully cured at 225° C.

The value of $T_g$ was determined by dynamic mechanic analysis (DMA) on an Alpha Technologies Model APA 2000.

A resin sample was degassed and poured into a mold consisting of two 13 in.×13 in.×0.125 in. (330 mm×330 mm×3.175 mm) polished steel plates, separated by 0.125 in (3.175 mm) silicone rubber spacers. The cast mixtures were allowed to cure at 120° C. for 120 min. After cooling, the cast sheet was demolded and prepared for testing by the following methods: ASTM D-638 (tensile); ASTM D-790 (flexural); and ASTM D-5045 (fracture toughness).

CONTROL EPOXY COMPOSITION 7

An epoxy resin composition having the following composition was prepared by blending 100 parts of epoxy A and B (in the relative amounts shown), 3.4 parts of PVF, 5 parts of DICY, with 4.2 parts of UR200. The resins and resin mixtures and results of the experiments are given in Table 2.

TABLE 2

|  | Composition 7 | Control Composition 7 |
|---|---|---|
| Epoxy resin A parts | 76.4 | 76.4 |
| Epoxy resin B parts | 23.6 | 23.6 |
| PVF parts | 3.4 | 3.4 |
| DICY parts | 5.0 | 5.0 |
| U24 parts | 4.2 |  |
| UR200 parts |  | 4.2 |
| Total parts | 112.6 | 112.6 |
| Gel time (min.) |  |  |
| @ 130° C. | 3.9 | 6.0 |
| @ 150° C. | 1.5 | 3.0 |
| Time to reach 95% cure (min) |  |  |
| @ 130° C. | 19 | 50 |
| @ 150° C. | 3 | 10 |
| $T_g$ (° C.) (Max G") |  |  |
| Cured at 130° C. for 60 min | 142 | 125 |
| Tensile |  |  |
| Ult. Strength, ksi | 12.2 | 10.8 |
| Modulus, msi | 0.46 | 0.43 |
| Elongation, % | 5.0 | 3.9 |
| Flexure |  |  |
| Yield Strength, ksi | 19.2 | 18.1 |
| Modulus, msi | 0.46 | 0.45 |
| Compression |  |  |
| Yield Strength, ksi | 16.3 | 15.2 |
| Modulus, msi | 0.45 | 0.45 |
| $K_{1c}$ (ksi-in$^{1/2}$) | 1.16 | 0.83 |

PROPERTIES OF EXEMPLARY EPOXY COMPOSITION 7 and CONTROL EPOXY COMPOSITION 7

Figure 3:
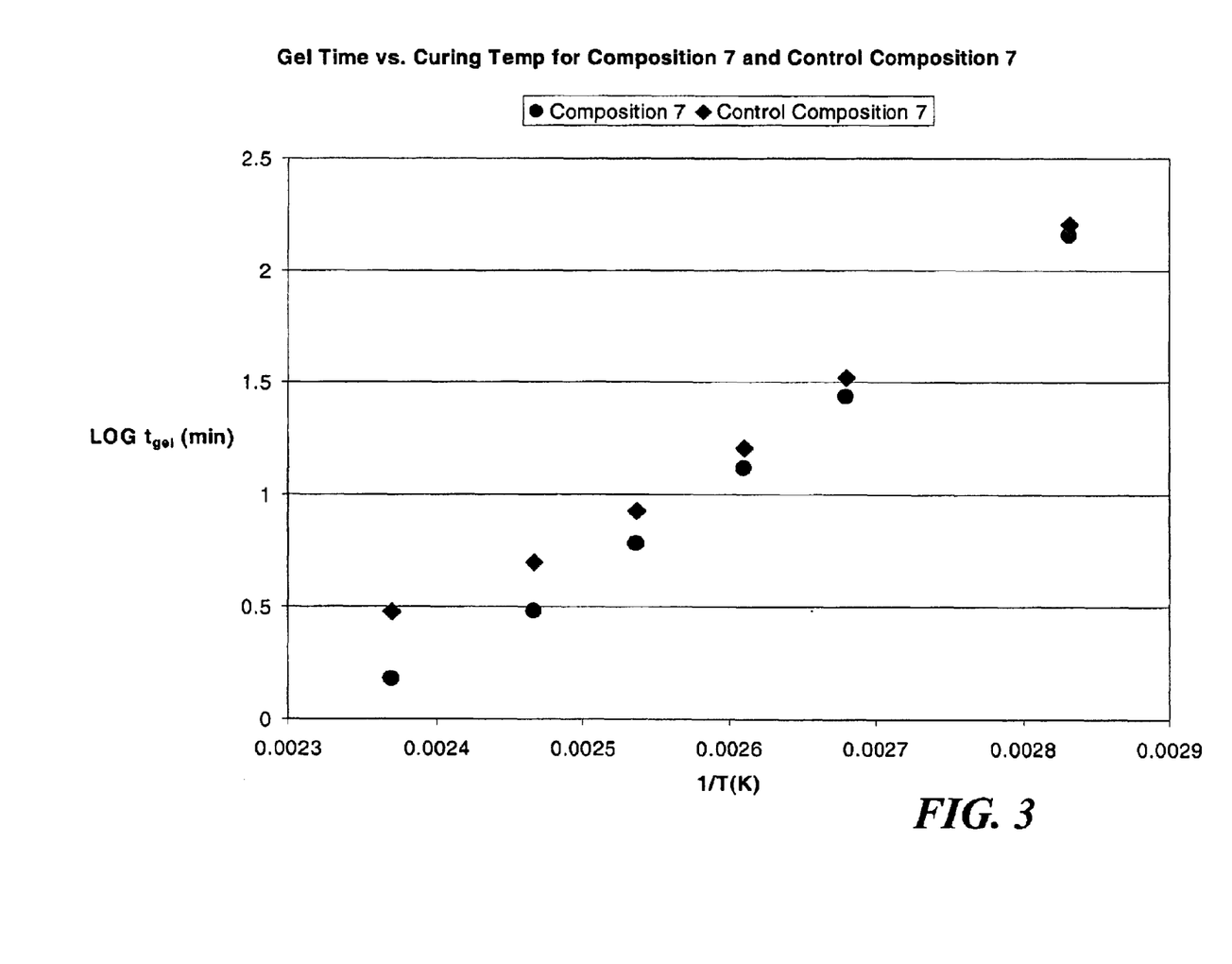
FIG. 3 is a graph showing the relationship between gel time and curing temperature, comparing a resin formulation embodiment of the present invention with a prior art resin formulation.
Figure 4:
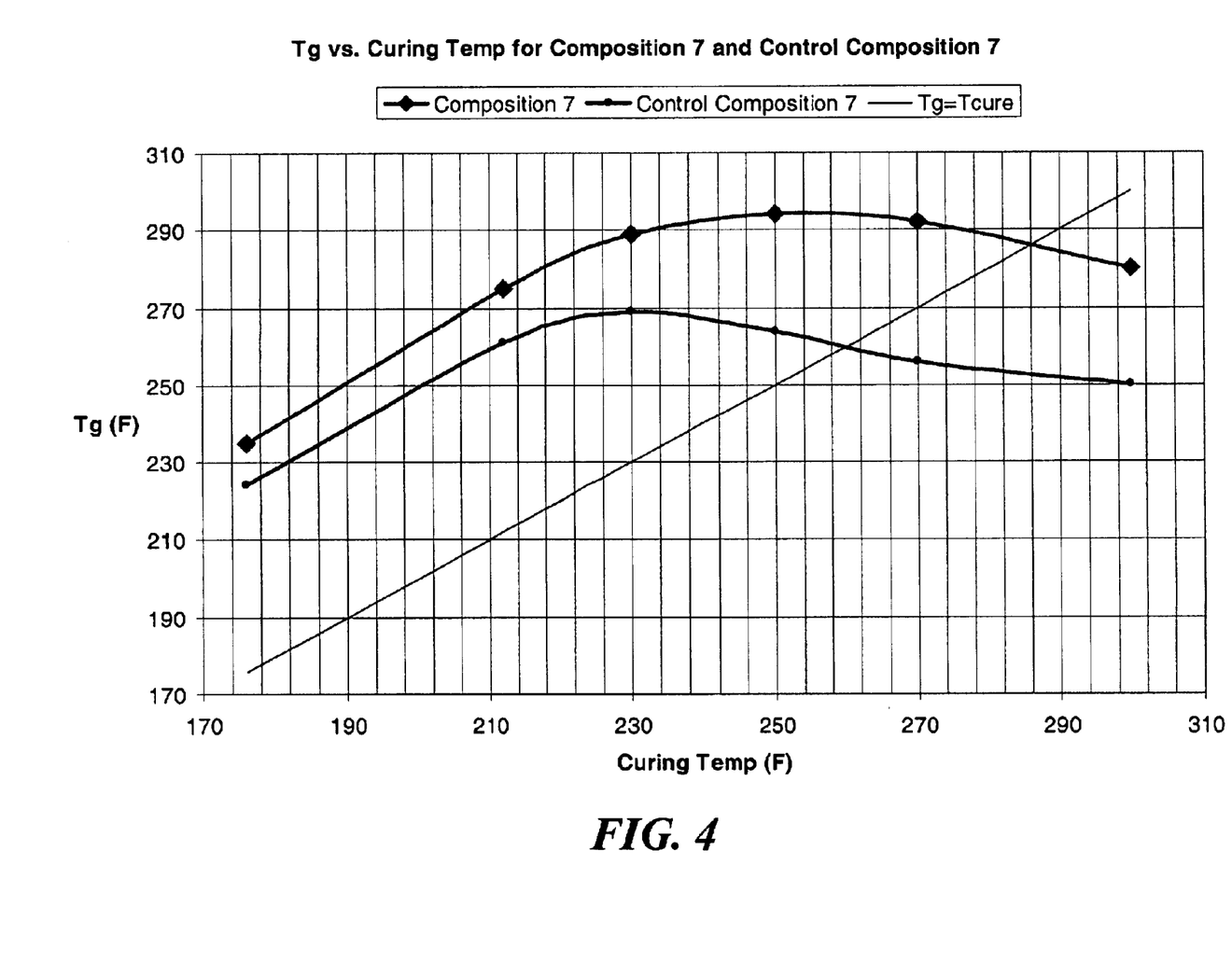
FIG. 4 is a graph showing the relationship between glass translation temperature and curing temperature, comparing a resin formulation embodiment of the present invention with a prior art resin formulation.

The resin compositions of Exemplary Epoxy Composition 7 and Control Epoxy Composition 7 were tested for isothermal cure properties at 176° F. (80° C.), 212° F. (100° C.), 230° F. (110° C.), 250° F. (121° C.), 270° F. (132° C.), and 300° F. (149° C.). All tests were carried out on the ALPHA Technologies APA 2000 equipped with parallel plate pies. FIGS. 3 and 4 show the gel time and $T_g$ of these resins (Exemplary Epoxy Composition 7 and Control Epoxy Composition 7) cured at the afore mentioned temperatures.

Next, a frozen resin block of Exemplary Epoxy Composition 7 was heated at 70° C. for a short time and coated onto a releasing paper to obtain a resin film. This resin film was set in a prepreg machine and impregnated into a sheet of unidirectional arranged carbon fiber (Type T600S, commercially available from Toray Industries, Inc.) to obtain a prepreg having a resin content Wr of 42%.

Exemplary Prepreg 1 (prepared from Exemplary Epoxy Composition 7) was cured at 135° C. for 2 hours and tested for mechanical properties. Exemplary Prepreg 2 (also prepared from Exemplary Epoxy Composition 7) was cured at 80° C. for 5 hours and tested for mechanical properties. Table 3 reveals the cure characteristics of these two prepreg examples.

TABLE 3

|  | Cured at 135° C./2 hr | Cured at 80° C./5 hr |
|---|---|---|
| 0° Tensile Strength (ksi) | 377 | 367 |
| Modulus (msi) | 19.9 | 20.1 |
| Strain (%) | 1.8 | 1.8 |
| 90° Tensile Strength (ksi) | 8.2 | 6.7 |
| 0° Compression Strength (ksi) | 201 | 220 |
| ILSS (ksi) | 11.7 | 12.2 |
| 0° Flexure Strength (ksi) | 254 | 282 |
| Modulus (ksi) | 20.8 | 20.2 |
| +/− 45° IPS Strength (ksi) | 18.5 | 16.1 |
| $T_g$ by DMA (° C.) (Max G") | 142 | 117 |

The resin composition and prepregs of the present invention can cure about twice as fast as the control materials, and have a $T_g$ that is higher than the cure temperature when used as a high temperature cure system (i.e. over 250° F., or over about 120° C.). Their shelf life and work life (heat stability) are as good as the slow cured control materials. Furthermore, the resin composition and prepregs of the present invention can also be used in low temperature curing application (about 176° F., or under about 80° C.).

EXEMPLARY EPOXY COMPOSITIONS 8–11

Epoxy resin compositions 8–11 were prepared by blending 100 parts of epoxy A, B and C (Examples 8–9), A, B and D (Example 10), and A, B and E (Example 11), in the relative amounts shown in Table 3, with 3.4 parts of PVF, 5 parts of DICY, and 4.2 parts of U-24. The resin compositions 8–11 were tested for isothermal cure properties at 176° F. (80° C.), 250° F. (121° C.), 270° F. (132° C.), and 300° F. (149° C.). All tests were carried out on the ALPHA Technologies APA 2000 equipped with parallel plate pies. The value of $T_g$ was determined by dynamic mechanic analysis (DMA) on an Alpha Technologies Model APA 2000.

TABLE 4

|  | Composition 8 | Composition 9 | Composition 10 | Composition 11 |
|---|---|---|---|---|
| Epoxy resin A parts | 37.5 | 36.3 | 63.5 | 62.5 |
| Epoxy resin B parts | 23.6 | 26.2 | 23.6 | 15.0 |
| Epoxy resin C parts | 38.9 | 37.5 |  |  |
| Epoxy resin D parts |  |  | 12.9 |  |
| Epoxy resin E parts |  |  |  | 22.5 |
| PVF parts | 3.4 | 3.4 | 3.4 | 3.4 |
| DICY parts | 5.0 | 5.0 | 5.0 | 5.0 |

TABLE 4-continued

|  | Composition 8 | Composition 9 | Composition 10 | Composition 11 |
|---|---|---|---|---|
| U24 parts | 4.2 | 4.2 | 4.2 | 4.2 |
| Total parts | 112.6 | 112.6 | 112.6 | 112.6 |

Figure 5:
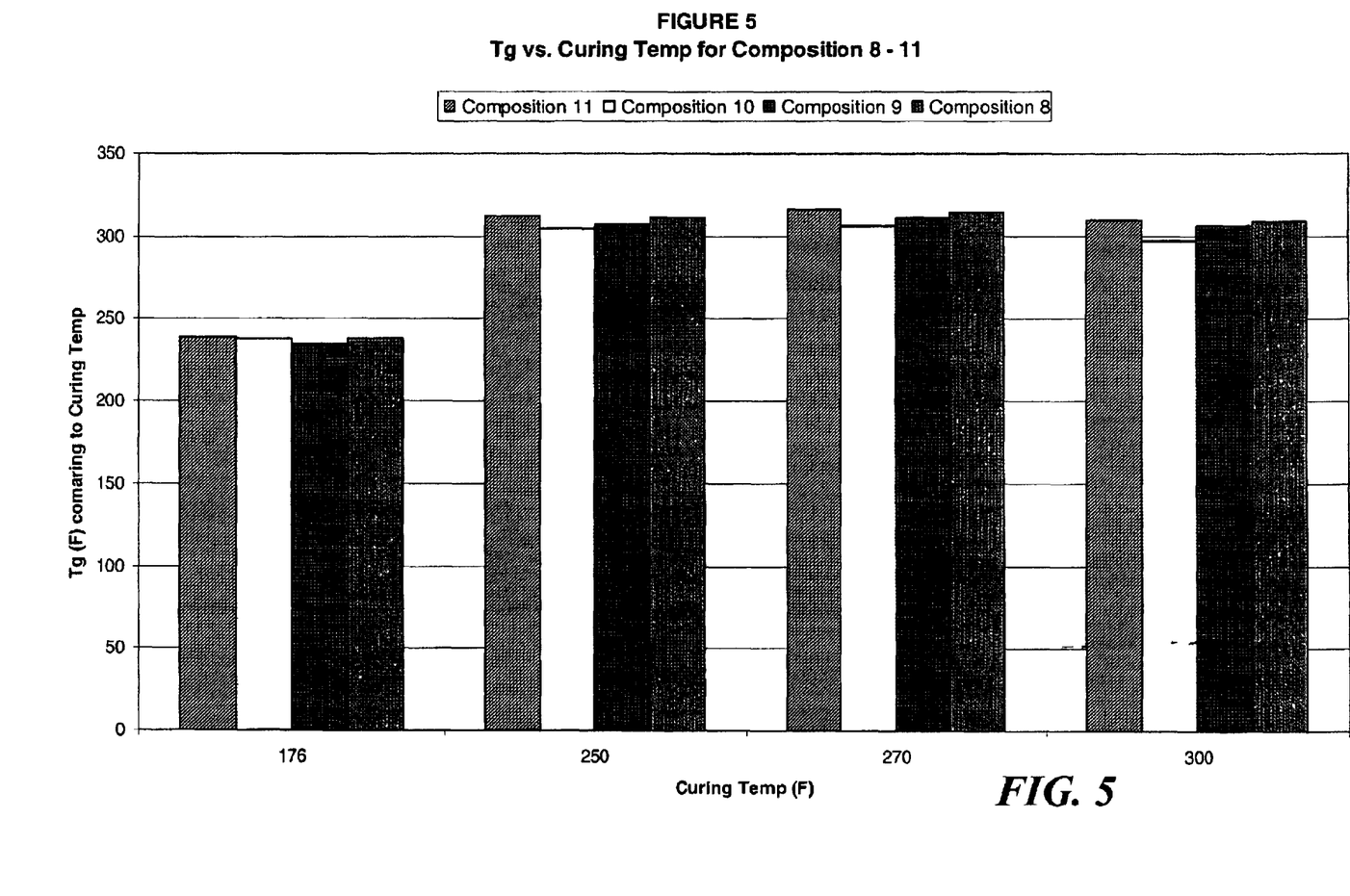
FIG. 5 is a graph showing the relationship between glass translation temperature and curing temperature, comparing a first resin formulation embodiment of the present invention with a second resin formulation embodiment of the present invention.

FIG. 5 shows the $T_g$ of these resins cured at the previously mentioned temperatures. It should be noted that the "glass transition temperature" (Tg), referred to herein throughout the specification means the Max G" value at 5° C./minute temperature ramp, measured as described above and as shown in the above Tables.

With respect to the examples provided above, it should be noted that each epoxy resin formulation example discussed above includes DICY as a latent curing agent, and a PVF additive. It should be understood that the improvements in curing times described above can be achieved by manipulating the proportions of the catalyst and the EEW of the epoxy resins within the formulation the epoxy resin formulation, without also employing a latent curing agent and a PVF additive. Thus while using a latentcuring agent and a PVF additive is preferred, their use is not required.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A resin matrix composition comprising:
   (a) an epoxy resin composition having an average of at least two epoxide groups per molecule; and
   (b) a catalyst comprising 2,4-toluene bis dimethyl urea, the epoxy resin composition comprising a blend of a first bisphenol-based epoxy resin having an epoxide equivalent weight (EEW) in the range of 150 to 195 and a second bisphenol-based epoxy resin having an EEW in the range of 400 to 1500, the amount and the EEW of the second epoxy resin being selected so that the epoxy resin composition has an average EEW in the range of 200 to 800, and an epoxy resin component having an epoxide functionality of at least three.

2. The resin matrix composition of claim 1, wherein an amount of said catalyst ranges from 0.5 phr to 10 phr.

3. The resin matrix composition of claim 2, wherein said amount of said catalyst ranges from 2 phr to 5 phr.

4. The resin matrix composition of claim 1, wherein the catalyst comprises at least 70% by weight of 2,4 toluene bis dimethyl urea.

5. The resin matrix composition of claim 4, wherein the catalyst comprises at least 95% by weight of 2,4 toluene bis dimethyl urea.

6. The resin matrix composition of claim 5, wherein the catalyst consists of 2,4 toluene bis dimethyl urea.

7. The resin matrix composition of claim 1, further having at least one of the following properties:
   (i) a glass transition temperature of at least 140° C. after the resin matrix composition has been heated to 150° C. for three minutes; and
   (ii) a glass transition temperature of at least 100° C. after the resin matrix composition has been heated to 80° C. for five hours.

8. The resin matrix composition of claim 7, which has a glass transition temperature of at least 140° C. after being heated to 150° C. for 3 minutes.

9. The resin matrix composition of claim 7, which has a glass transition temperature of at least 100° C. after being heated to 80° C. for 5 hours.

10. The resin matrix composition of claim 1, wherein the relative proportions of said epoxy resin composition and said catalyst have been selected to achieve at least 95% curing after the resin matrix composition has been heated to 150° C. for five minutes.

11. The resin matrix composition of claim 1, wherein the relative proportions of said epoxy resin composition and said catalyst are selected to achieve at least 95% curing after the resin matrix composition has been heated to 120° C. for 20 minutes.

12. The resin matrix composition of claim 1, wherein the relative proportions of said epoxy resin composition and said catalyst are selected to achieve a glass transition temperature of 118° C. after the resin matrix composition has been heated to 80° C. for five hours.

13. An article comprising the resin matrix composition according to claim 1 and a reinforcing agent, wherein the resin matrix composition is cured.

14. The article of claim 13, wherein the reinforcing agent comprises at least one reinforcing component selected from the group consisting of glass fibers, aramid fibers and graphite fibers.

15. An adhesive film comprising the resin matrix composition according to claim 1.

16. The adhesive film of claim 15, wherein the adhesive film is on a supporting material comprising a polyester or a polyamide.

17. A prepreg comprising: (a) a resin matrix composition according to claim 1 and (b) a plurality of reinforcing fibers.

18. A prepreg according to claim 17, wherein the plurality of reinforcing fibers comprises at least one type of reinforcing fiber selected from glass fibers, aramid fibers and graphite fibers, which fibers optionally take the form of at least one fibrous material selected from woven fibers, matted fibers and unidirectional fibers.

19. A method of curing an epoxy resin formulation to at least a 95% cure, which method comprises the steps of: (a) preparing an epoxy resin composition according to claim 1 and (b) heating the epoxy resin composition to at least 120° C.

20. A method according to claim 19, wherein the heating is carried out for no more than 20 minutes.

21. A method according to claim 19, wherein the heating is carried out at a temperature of at least 130° C.

22. A method according to claim 19, wherein the heating is carried out at a temperature of at least 150° C.

23. A method according to claim 22, wherein the heating is carried out for at least 3 minutes.

24. A method according to claim 22, wherein the heating is carried out for a period of from 3 to 120 minutes.

25. A method according to claim 19, wherein the cured epoxy resin formulation has a glass transition temperature of at least 140° C.

26. A method according to claim 25, wherein the glass transition temperature is from 140 to 150° C.

27. A method according to claim 22, wherein the heating is carried out for no more than 5 minutes.

28. A method according to claim 27, wherein the heating is carried out for no more than 3 minutes.

29. A method according to claims 19, wherein the epoxy composition further comprises a plurality of reinforcing fibers.

30. The prepreg of claim 17, wherein an amount of said catalyst ranges from 0.5 to 10 phr.

31. The prepreg of claim 30, wherein said amount of said catalyst ranges from 2 phr to 5 phr.

32. The prepreg of claim 17, wherein the prepreg is curable to at least 95% after being heated to 150° C.

33. The prepreg of claim 17, wherein the prepreg is curable to at least 95% after being heated to 120° C.

34. The prepreg of claim 18, wherein the epoxy composition has a glass transition temperature of at least 118° C. after being heated to 80° C. for five hours.

35. A method for curing an epoxy resin formulation, such that the epoxy resin formulation reaches a 95% cure, the method comprising:
(a) providing the epoxy resin formulation comprising:
    (i) an epoxy resin composition having an average of at least two epoxide groups per molecule; and
    (ii) a latent amine curing agent;
(b) mixing at least 0.5 phr of a catalyst into the resin formulation, wherein the catalyst comprises 2,4-toluene bis dimethyl urea; and
(c) heating the resin formulation after mixing with the catalyst, to a temperature of at least 120° C.,
wherein the epoxy resin composition comprises a blend of a first bisphenol-based epoxy resin having an epoxide equivalent weight (EEW) in the range of 150 to 195 and a second bisphenol-based epoxy resin having an EEW in the range of 400 to 1500, the amount and the EEW of the second epoxy resin being selected so that the epoxy resin composition has an average EEW in the range of 200 to 800, and an epoxy resin component having an epoxide functionality of at least three.

36. The method of claim 35, wherein the step of heating is executed for no more than 20 minutes.

37. The method of claim 35, wherein the step of heating comprises the step of heating the resin formulation to a temperature of at least 130° C.

38. The resin matrix composition of claim 1, wherein the resin matrix composition further comprises a latent curing agent.

39. The resin matrix composition of claim 38, wherein said latent curing agent comprises dicyandiamide.

40. The method of claim 35, wherein the step of heating comprises the step of heating the resin formulation to a temperature of at least 150° C.

41. The method of claim 40, wherein the step of heating is executed for at least 3 minutes.

42. The method of claim 40, wherein the step of heating executed for a period of 3 to 120 minutes.

43. The method of claim 35, wherein the cured epoxy resin formulation has a glass transition temperature of at least 140° C.

44. The method of claim 43, wherein the glass transition temperature is from 140 to 150° C.

45. The method according to claim 40, wherein the step of heating is executed for no more than 5 minutes.

46. The method of claim 45, wherein the step of heating is executed for no more than 3 minutes.

47. The method of claim 35, wherein the epoxy resin formulation further comprises a plurality of reinforcing fibers.

48. The resin matrix composition of claim 1, wherein the resin matrix composition has a viscosity of no more than 20,000 poise at 40° C.

49. The resin matrix composition according to claim 1, wherein the epoxy resin composition consists essentially of the said blend of bis-phenol components.

50. The resin matrix composition of claim 1, wherein the epoxy resin composition comprises a blended epoxy selected from one of the following mixtures:
(a) a mixture of a diglycidyl ether of a first bisphenol having an epoxide equivalent weight (EEW) of 150–195, and a diglycidyl ether of a second bisphenol having an EEW of 400to 1500;
(b) a mixture of a diglycidyl ether of first bisphenol A having an EEW of 150 to 195, a diglycidyl ether of a second bisphenol having an EEW of 400 to 1500, and an epoxy phenolic novalac resin with an epoxide functionality of 2.2 to 4 and having an EEW of 170 to 190; and
(c) a mixture of a diglycidyl ether of a first bisphenol having an EEW of 150 to 195, a diglycidyl ether of a second bisphenol having an EEW of 400 to 1500, and a tetra-functional epoxy having an EEW of 117 to 134.

51. A resin matrix composition comprising:
(a) an epoxy resin composition having an average of at least two epoxide groups per molecule;
(b) a catalyst comprising 2,4-toluene bis dimethyl urea, and
(c) a thermoplastic additive,
wherein the epoxy resin composition comprises a blend of a first epoxy resin having an epoxide equivalent weight (EEW) in a first range and a second epoxy resin having an EEW in a second range different from the first range, and the amount and the EEW of the second epoxy resin being selected so that the epoxy resin composition has an average EEW in the range of 200 to 800, and an epoxy resin component having an epoxide functionality of at least three.

52. An article comprising the resin matrix composition according to claim 51 and a reinforcing agent, wherein the resin matrix composition is cured.

53. An adhesive film comprising the resin matrix composition according to claims 51.

54. A prepreg comprising: (a) a resin matrix composition according to claim 51, and (b) a plurality of reinforcing fibers.

55. A method of curing an epoxy resin formulation to at least a 95% cure which method comprises the steps of: (a) preparing an epoxy resin composition according to claim 51 and (b) heating the epoxy resin composition to at least 120° C.

56. The resin matrix composition of claim 51, wherein the resin matrix composition has at least one of the following properties
(i) a glass transition temperature of at least 140°C. after the resin matrix composition has been heated to 150°C. for three minutes; and
(ii) a glass transition temperature of at least 100°C. after the resin matrix composition has been heated to 80°C. for five hours.

57. A resin matrix composition comprising:
(a) an epoxy resin composition having an average of at least two epoxide groups per molecule; and (b) a catalyst comprising 2,4-toluene bis dimethyl urea, and
(c) a latent curing agent;
wherein the resin matrix composition has at least one of the following properties
(i) a glass transition temperature of at least 140° C. after the resin matrix composition has been heated to 150° C. for three minutes; and
(ii) a glass transition temperature of at least 100° C. after the resin matrix composition has been heated to 80° C. for five hours,
wherein the epoxy resin composition comprises a blend of a first bisphenol-based epoxy resin having an epoxide equivalent weight (EEW) in the range of 150 to 195 and a second bisphenol-based epoxy resin having an EEW in the range of 400 to 1500, the amount and the EEW of the second bisphenol-based epoxy resin being selected so that the epoxy resin composition has an average EEW in the range of 200 to 800, and an epoxy resin component having an epoxide functionality of at least three.

58. An article comprising the resin matrix composition according to claim 57 and a reinforcing agent, wherein the resin matrix composition is cured.

59. An adhesive film comprising the resin matrix composition according to claim 57.

60. A prepreg comprising: (a) a resin matrix composition according to claim 57 and (b) a plurality of reinforcing fibers.

61. A method of curing an epoxy resin formulation to at least a 95% cure, which method comprises the steps of: (a) preparing an epoxy resin composition according to claim 57 and (b) heating the epoxy resin composition to at least 120° C.

62. A method for curing an epoxy resin formulation, such that the epoxy resin formulation reaches a 95% cure, the method comprising the steps of:
(a) providing the epoxy resin formulation comprising:
(i) an epoxy resin composition having an average of at least two epoxide groups per molecule; and
(ii) a latent amine curing agent;
(b) mixing at least 0.5 phr of a catalyst into the resin formulation, wherein the catalyst comprises 2,4-toluene bis dimethyl urea; and
(c) heating the resin formulation after mixing with the catalyst, to a temperature of at least 120° C.,
wherein the epoxy resin formulation further comprises a plurality of reinforcing fibers,
wherein the epoxy resin composition comprises a blend of a first epoxy resin having an epoxide equivalent weight (EEW) in a first range and a second epoxy resin having an EEW in a second range different from the first range, and the amount and the EEW of the second epoxy resin being selected so that the epoxy resin composition has an average EEW in the range of 200 to 800, and an epoxy resin component having an epoxide functionality of at least three.

63. The resin matrix composition of claim 51, wherein the resin matrix composition has at least one of the following properties
(i) a glass transition temperature of at least 140° C. after the resin matrix composition has been heated to 150° C. for three minutes; and
(ii) a glass transition temperature of at least 100° C. after the resin matrix composition has been heated to 80° C. for five hours.

64. The resin matrix composition of claim 57, wherein the epoxy resin composition comprises at least one of an epoxy phenol novolac, a trifunctional epoxy resin, a tetrafunctional epoxy resin, and a halogenated derivative thereof.

65. A resin matrix composition comprising:
(a) an epoxy resin composition having an average of at least two epoxide groups per molecule; and
(b) a catalyst comprising 2,4-toluene bis dimethyl urea, and
wherein the epoxy resin composition comprises a blend of a first epoxy resin having an epoxide equivalent weight (EEW) in a first range and a second epoxy resin having an EEW in a second range different from the first range, and the amount and the EEW of the second epoxy resin being selected so that the epoxy resin composition has an average EEW in the range of 200 to 800, and an epoxy resin component having an epoxide functionality of at least three.

66. The resin matrix composition of claim 65, wherein said the composition further comprises a latent curing agent.

67. The resin matrix composition of claim 65, wherein the epoxy resin composition comprises a blended epoxy selected from one of the following mixtures:
(a) a mixture of a diglycidyl ether of a first bisphenol having an epoxide equivalent weight (EEW) of 150–195, and a diglycidyl ether of a second bisphenol having an EEW of 400 to 1500;
(b) a mixture of a diglycidyl ether of first bisphenol A having an EEW of 150 to 195, a diglycidyl ether of a second bisphenol having an EEW of 400 to 1500, and an epoxy phenolic novalac resin with an epoxide functionality of 2.2 to 4 and having an EEW of 170 to 190; and
(c) a mixture of a diglycidyl ether of a first bisphenol having an EEW of 150 to 195, a diglycidyl ether of a second bisphenol having an EEW of 400 to 1500, and a tetra-functional epoxy having an EEW of 117 to 134.

68. An article comprising the resin matrix composition according to claim 65 and a reinforcing agent, wherein the resin matrix composition is cured.

69. The article of claim 66, wherein the reinforcing agent comprises at least one reinforcing component selected from the group consisting of glass fibers, aramid fibers and graphite fibers, and wherein the fibers comprise at least one of woven fibers, matted fibers and unidirectional fibers.

70. An adhesive film comprising the resin matrix composition according to claim 65.

71. The adhesive film of claim 68, wherein the adhesive film is on a supporting material comprising a polyester or a polyamide.

72. A prepreg comprising: (a) a resin matrix composition according to claim 65 and (b) a plurality of reinforcing fibers.

73. The resin matrix composition of claim 51, wherein the thermoplastic additive comprises at least one of a polyvinylformal (PVF), a polymethylmethacrylate (PMMA), a polyarylethersulfone (PES), a polysulfone (PSF), a polyimide (PI), a polyetherimide (PEI) and a polyethylene oxide (PEO).

74. A fiber reinforced composite comprising fibers and the resin matrix composition of claim 1, wherein the resin matrix composition is cured.

75. A fiber reinforced composite comprising fibers and the resin matrix composition of claim 51, wherein the resin matrix composition is cured.

76. A fiber reinforced composite comprising fibers and the resin matrix composition of claim 57, wherein the resin matrix composition is cured.

77. A fiber reinforced composite comprising fibers and the resin matrix composition of claim 62, wherein the resin matrix composition is cured.

78. A fiber reinforced composite comprising fibers and the resin matrix composition of claim 65, wherein the resin matrix compostion is cured.

79. A film comprising a substrate and an adhesive comprising the resin matrix composition, wherein the resin matrix compostion comprising:
  (a) an epoxy resin composition having an average of at least two epoxide groups per molecule; and
  (b) a catalyst comprising 2,4toluene bis dimethyl urea, and
  wherein the epoxy resin composition comprises a blend of a first epoxy resin having an epoxide equivalent weight (EEW) in a first range and a second epoxy resin having an EEW in a second range different from the first range, and the amount and the EEW of the second epoxy resin being selected so that the epoxy resin composition has an average EEW in the range of 200 to 800, wherein the adhesive film is on a supporting material comprising a polyester or a polyamide.

80. A prepreg comprising: (a) a resin matrix composition and (b) a plurality of reinforcing fibers,
  wherein the resin matrix composition comprising:
  (a) an epoxy resin composition having an average of at least two epoxide groups per molecule; and
  (b) a catalyst comprising 2,4 toluene bis dimethyl urea, and
  wherein the epoxy resin composition comprises a blend of a first epoxy resin having an epoxide equivalent weight (EEW) in a first range and a second epoxy resing having an EEW in a second range different from the first range, and the amount and the EEW of the second epoxy resin being selected so that the epoxy resin composition has an average EEW in the range of 200 to 800.

81. A fiber reinforced composite comprising: (a) a resin matrix composition and (b) a plurality of reinforcing fibers,
  wherein the resin matrix composition is cured and comprises:
  (a) an epoxy resin composition having an average of at least two epoxide groups per molecule; and
  (b) a catalyst comprising 2,4 toluene bis dimethyl urea, and
  wherein the epoxy resin composition comprises a blend of a first epoxy resin having an epoxide equivalent weight (EEW) in a first range and a second epoxy resin having an EEW in a second range different from the first range, and the amount and the EEW of the second epoxy resin being selected so that the epoxy resin composition has an average EEW in the range of 200 to 800.

* * * * *